US008657555B2

(12) United States Patent
Kokubo et al.

(10) Patent No.: US 8,657,555 B2
(45) Date of Patent: Feb. 25, 2014

(54) COUNTER EJECTOR OF CARDBOARD SHEET BOX-MAKING MACHINE

(75) Inventors: Hidenori Kokubo, Kasugai (JP); Yusuke Tozuka, Kasugai (JP)

(73) Assignee: Kabushiki Kaisha Isowa, Aichi (JP)

( * ) Notice: Subject to any disclaimer, the term of this patent is extended or adjusted under 35 U.S.C. 154(b) by 26 days.

(21) Appl. No.: 13/074,428

(22) Filed: Mar. 29, 2011

(65) Prior Publication Data

US 2011/0268551 A1 Nov. 3, 2011

(30) Foreign Application Priority Data

Apr. 29, 2010 (JP) ................................ 2010-104623

(51) Int. Cl.
*B65H 31/30* (2006.01)
*B65G 57/00* (2006.01)

(52) U.S. Cl.
USPC .................. 414/789.9; 414/788.9; 414/789.1; 271/215; 271/223

(58) Field of Classification Search
USPC ............. 414/788.1, 788.9, 789, 789.1, 789.9; 271/223, 213, 214, 215, 217
See application file for complete search history.

(56) References Cited

U.S. PATENT DOCUMENTS

| | | | | | |
|---|---|---|---|---|---|
| 3,161,098 | A * | 12/1964 | Thumim | | 83/90 |
| 3,225,637 | A * | 12/1965 | Thumim | | 83/526 |
| 3,357,700 | A * | 12/1967 | Bradicich | | 271/130 |
| 3,744,649 | A * | 7/1973 | Ward, Jr. | | 414/788.7 |
| 4,195,959 | A * | 4/1980 | Schmitt | | 414/788.9 |
| 5,160,129 | A * | 11/1992 | Siriporn et al. | | 271/178 |
| 5,553,551 | A * | 9/1996 | Crombie | | 108/181 |
| 6,129,503 | A | 10/2000 | Schenone | | |
| 6,146,084 | A * | 11/2000 | Doyle | | 414/788.9 |
| 6,241,458 | B1 * | 6/2001 | Berndl | | 414/790.3 |
| 8,065,967 | B2 * | 11/2011 | Wong | | 108/181 |
| 2006/0225624 | A1 * | 10/2006 | Grace | | 108/26 |
| 2010/0190626 | A1 | 7/2010 | Taketsugu et al. | | |

FOREIGN PATENT DOCUMENTS

| | | |
|---|---|---|
| JP | 3298896 | 4/2002 |
| JP | 2008-149730 | 7/2008 |
| JP | 2009-051024 A | 3/2009 |
| JP | 2009-184325 | 8/2009 |

* cited by examiner

*Primary Examiner* — Gregory Adams
*Assistant Examiner* — Lynn Schwenning
(74) *Attorney, Agent, or Firm* — Stroock & Stroock & Lavan LLP

(57) ABSTRACT

A counter ejector of cardboard sheet box-making machine is disclosed. A front contact plate contacting cardboard sheets is movable in a feed direction. A spanker is disposed to face the front contact plate in the feed direction, and contacts the back edge portion of the cardboard sheet, aligning the sheet edge portions. Ledges separate cardboard sheets loaded between front contact plate and the spanker, forming a batch of a predetermined number of sheets. A transfer conveyor transfers batches in a transfer direction, which is the same direction as the feed direction. An elevator is furnished with a table, and carries batches from the height at which the front contact plate and the spanker are disposed to the height at which the transfer conveyor is disposed. The table is moved by the same amount and in the same movement direction as the movement of the front contact plate.

5 Claims, 7 Drawing Sheets

COUNTER EJECTOR OF CARDBOARD SHEET BOX-MAKING MACHINE

BACKGROUND OF THE INVENTION

1. Field of the Invention

The present invention relates to a counter ejector of cardboard sheet box-making machine, and in particular to a counter ejector of cardboard sheet box-making machine for counting and forming batches of a predetermined number of cardboard sheets which have been folded and glued after being subjected to processing such as printing, creasing, slotting, and die-cutting.

2. Description of the Related Art

A cardboard sheet box-making machine comprises a folder-gluer for folding and gluing with glue a printed or otherwise processed cardboard sheet, and a counter ejector for counting the cardboard sheets supplied from the folder-gluer, forming a batch of a predetermined number of cardboard sheets, and sending this batch to a follow-on bundler. Cardboard sheet box-making machines of this type are disclosed in JP-A-2009-51024 (having counterparts US2010/0190626A1 and EP2181952A1), JP-B-3298896 (having a counterpart U.S. Pat. No. 6,129,503A) and the like and are well known.

The counter ejector disclosed in JP-A-2009-51024 comprises a hopper on which cardboard sheets supplied from a folder-gluer are loaded, multiple ledges for separating cardboard sheets loaded in the hopper and forming batches of a predetermined number of sheets; and an elevator for raising those batches for loading. The hopper has a front contact plate for contacting the front end portion of the cardboard sheet transferred from a pair of exit rollers placed downstream from the folder-gluer; and a spanker for contacting the back edge portion of that transferred cardboard sheet and aligning the edge of the sheet. The elevator descends as the elevator loads the batch formed by the horizontal and vertical movement of multiple ledges, handing the batch over to a lower conveyor for transfer. After this handover is completed, the elevator rises to a predetermined height to load the next batch. The elevator repeats the raising and lowering motion in the vertical direction to hand over each sequentially formed batch.

In general, a cardboard sheet box-making machine follows a particular order to perform processes such as printing on multiple types of cardboard sheet having varying dimensions in the feed direction. In a counter ejector hopper, a spanker is disposed in a certain positional relationship to folder-gluer outlet rollers in order to align sheet end portions; the front contact plate is movably disposed to adjust the gap relative to the spanker in the horizontal direction according to the dimensions of the cardboard sheet supplied from the folder-gluer. This enables the hopper to load cardboard sheets while justifying edges ends, even when dimensions between cardboard sheets differ. The elevator also has a table with a width matched to the maximum dimension of the cardboard sheet which can be processed by the cardboard sheet box-making machine.

When a cardboard sheet box-making machine processes a cardboard sheet with a relatively short dimension in the feed direction, the front contact plate in the hopper of the counter ejector moves in accordance with the short dimension of the cardboard sheet so as to reduce the gap in the horizontal direction relative to the spanker.

However, in the conventional counter ejector disclosed in JP-A-2009-51024, JP-B-3298896 and the like the elevator must be stopped at a lowered position until each batch is completely handed over to a lower conveyor for feeding from the elevator table, so as not to disturb the handover of the batch. The width of the elevator table is matched to the maximum dimension of the processable cardboard sheet, therefore even when handing over a cardboard sheet batch with a relatively short dimension, the elevator has to be stopped in the lowered position for the same amount of time as the stopping time until the cardboard sheet batch with the longest dimension is handed over from the table to the lower conveyer. A certain halt time is always required at the elevator lowered position even when continuously handing over batches with small numbers of sheets of relatively short-dimensioned cardboard sheets; this makes it difficult for conventional counter ejectors to achieve high speed transfer of relatively short cardboard sheets.

SUMMARY OF THE INVENTION

It is therefore an object of the present invention to provide a counter ejector of a cardboard sheet box-making machine capable of speeding up the transferring of batches by shortening the time for handover of cardboard sheet batches from an elevator table to a transfer conveyor.

The above object is achieved according to the present invention by providing a counter ejector of a cardboard sheet box-making machine for counting and forming batches of a predetermined number of cardboard sheets which have been folded and glued by a folder-gluer after being subjected to processing such a printing, the counter ejector comprising: a front contact plate for contacting the front edge portion of a cardboard sheet fed in a predetermined feed direction from the folder-gluer, the front contact plate being disposed so as to be movable in the feed direction; a spanker disposed in the feed direction facing the front contact plate for contacting the back edge portion of the fed cardboard sheet and aligning the back edge portion; a ledge for separating a plurality of cardboard sheets loaded between the front contact plate and the spanker, the ledge being capable of advancing and retracting in a horizontal direction so as to form batches of a predetermined number of sheets; a transfer conveyor disposed below the front contact plate and the spanker for transferring the batches in a transfer direction which is the same as the predetermined feed direction; an elevator, furnished with a table on which the cardboard sheet batches are loaded, for performing a raising and lowering movement to convey the batches, the table being movable in the feed direction; a front contact plate drive device for moving the front contact plate in the feed direction; a table drive device for moving the table in the feed direction; and a control device for controlling the front contact plate drive device and the table drive device so as to move the table in the feed direction by the amount of movement of the front contact plate in the feed direction; wherein the table moves up and down at a position moved in the feed direction under the control of the control device.

In the present invention thus constituted, the table moves in the feed direction by just the amount of movement of the front contact plate in the feed direction. Under control of the control device, the table performs a raising and lowering motion at the position of movement in feed direction. Thus, compared to the case in which the elevator table is at a constant positional relationship with respect to the position of the alignment plate, in the present invention the time required for the handover of a batch from the elevator table to the transfer conveyor is shortened to the degree that the batch dimension in the cardboard sheet feed direction is shortened, thereby enabling an increase in batch transfer speed. Also, the table does not move in the feed direction during raising and lowering of the table, therefore no operation is required to return the table to a predetermined positional relationship to the front contact plate, and the timing at which the table can receive the next batch can be speeded up.

In the present invention, the ledge may be given the function of pushing down from above on the batch loaded onto the elevator table, in addition to original function thereof of separating loaded cardboard sheets to form batches. The ledge may also be a single ledge or multiple ledges including auxiliary ledges.

In the present invention, the table is able to move in the feed direction; it is acceptable for the entire elevator including the table to move, or for only the table to move.

Specifically, the table drive device may move the elevator including the table in the feed direction. Instead of this, the table drive device may move only the table in the feed direction.

In a preferred embodiment of the present invention, the control device controls the front contact plate drive device and the table drive device so that when a cardboard sheet order is changed, the front contact plate and the table move in the feed direction by the dimensional difference in the feed direction between cardboard sheets respectively processed based on a previous order and a subsequent order.

In the embodiment of the present invention thus constituted, the control device controls the front contact plate drive device and the table drive device so that when a change from a previous order to a subsequent order is made, the front contact plate and the table moved by just the dimensional difference in the feed direction between cardboard sheets respectively processed based on a previous order and a subsequent order. As a result, positioning of the front contact plate and the table can be accomplished in the embodiment of the present invention in a short time simply by causing the front contact plate and the table to move by just the dimensional difference in cardboard sheets.

In another preferred embodiment of the present invention, the transfer conveyer is arranged to extend downward in the path of the raising and lowering table, and when the table reaches the lowest position in the raising and lowering path, the batch loaded on the table is transferred, and the transfer conveyor transfers the batch.

In a conventional batch ejection device such as that disclosed in JP-A-2005-35118, a reciprocating pusher is disposed on an ejecting conveyor to push a batch from an ejecting conveyor onto which the batch on the table is transferred. In this conventional device, the table must be stationery below the ejecting conveyor so as not to interfere with the pusher, even during the period when the pusher makes the return movement back to original position thereof after the outbound travel to push out the batch. The problem therefore arises that the timing at which the table rises to receive the next batch is delayed due to the return movement of the pusher.

Therefore in the embodiment of the present invention thus constituted, when the table reaches the lowermost position of raising and lowering path thereof, a batch is loaded onto the transfer conveyor from the table, and the batch is transferred without the push out operation using a pusher found in a conventional device. As a result, when the batch is transferred from the table, the table is immediately able to rise, thereby shortening the time until it receives the next batch.

The above and other objects and features of the present invention will be apparent from the following description by taking reference with accompanying drawings employed for preferred embodiments of the present invention.

DETAILED DESCRIPTION OF THE PREFERRED EMBODIMENTS

Hereinafter, a counter injector of a cardboard sheet box-making machine according to a preferred embodiment of the present invention will be explained with reference to the drawings.

Overview Configuration

Figure 1:
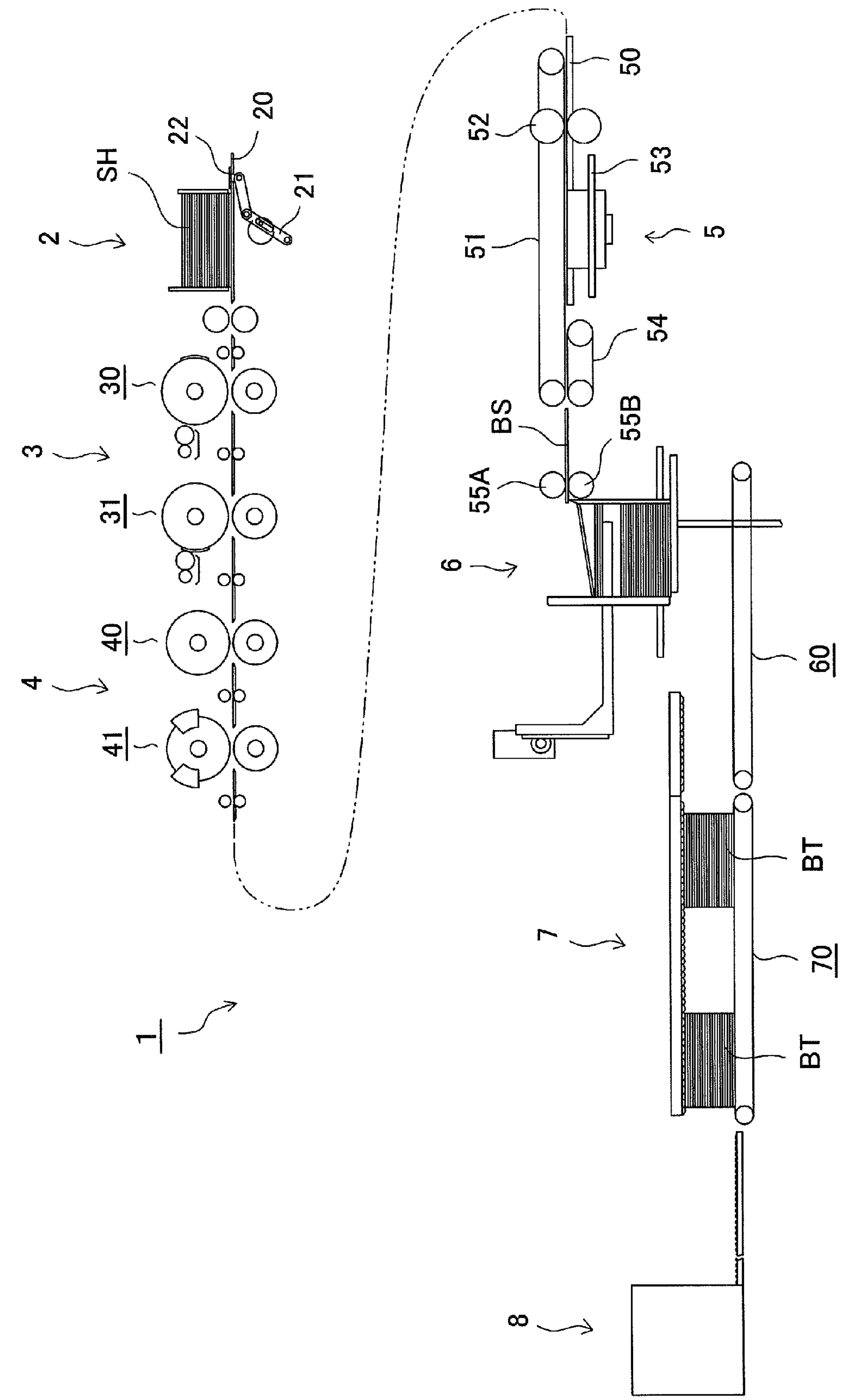
FIG. 1 is a side view showing the overall configuration of a cardboard sheet box-making machine furnished with a counter ejector according to an embodiment of the present invention.

FIG. 1 is a side view showing the overall configuration of a cardboard sheet box-making machine furnished with a counter ejector according to the embodiment of the present invention. The cardboard sheet box-making machine 1 is furnished with a sheet feed device 2 for feeding cardboard sheets SH; a printing device 3 for printing the cardboard sheets SH; a slotter-creaser 4 for placing lines on the cardboard sheets SH, cutting slots, and forming joining tabs; and a folder-gluer 5 for supplying glue to the joining tabs, bending the cardboard sheets SH along the lines, and gluing into a box shape. The cardboard sheet box-making machine 1 is further furnished on the downstream side of the folder-gluer 5 with a counter ejector 6 for counting cardboard sheets BS glued into a box shape, and for forming batches of a predetermined number of sheets and transferring same; a and a bundler 8 for bundling batches.

The sheet feed device 2 is furnished with a table 20; multiple cardboard sheets SH manufactured by a corrugating machine are loaded onto the table 20. The sheet feed device 2 is furnished with a kicker 22 for effecting a shuttle motion using a crank lever mechanism 21. The kicker 22 supplies the cardboard sheets SH one sheet at a time by kicking out the cardboard sheet SH at the very bottom of the multiple cardboard sheets SH and supplying same to the printing device 3.

The printing device 3 is furnished with multiple printing units 30, 31. Each printing unit is furnished with a different colored ink roller. The printing device 3 prints the cardboard sheets SH in two colors using both printing units 30, 31 and supplies these printed cardboard sheets SH to the slotter-creaser 4.

The slotter-creaser 4 is furnished with a line roller 40 for applying lines, and a slotter 41 for slotting. The slotter-creaser 4 applies lines and makes slots in the cardboard sheets SH using the line roller 40 and the slotter 41, forms connecting tabs, and supplies the cardboard sheets SH thus processed to the folder-gluer 5.

The folder-gluer 5 coats the tabs with glue while moving the cardboard sheets SH, then folds the sheets along lines and the like. The folder-gluer 5 is furnished with a guide roller 50*a* in the feed direction of the cardboard sheets SH. A looped conveyor belt 51 is disposed above the guide roller 50*a* so as to circulate. A glue supply device 52, a folding bar 53, and a folding belt 54 are disposed along the guide roller 50*a* and the conveyor belt 51.

The folder-gluer 5 uses the guide roller 50 and the conveyor belt 51 to support and move the cardboard sheets SH on which lines and joining tabs are formed. During the movement of the cardboard sheets SH, the folder-gluer 5 applies glue to the joining tabs using the glue supply device 52 and folds the cardboard sheets SH using the folding bar 53. Moreover, the folder-gluer 5 uses the folding bar 53 to fold bent cardboard sheets SH, and glues the joining tabs to manufacture the folded box-shaped cardboard sheets BS. The folder-gluer 5 supplies box-shaped cardboard sheets BS from a pair of exit rollers 55A, 55B to the counter ejector 6.

The counter ejector 6 counts the number of box-shaped cardboard sheets BS supplied from the folder-gluer 5, forming a batch BT from a predetermined number of sheets, and feeds the batch BT to a feed conveyor 7 using the lower conveyor 60. Details of the counter ejector 6 are explained below.

The feed conveyor 7 includes a batch accumulating conveyor 70 for receiving batches fed out from the lower conveyor 60 on the counter ejector 6. The feed conveyor 7 feeds batches BT to the bundler 8 using multiple conveyors such as the batch accumulating conveyor 70.

The bundler 8 bundles the batches BT fed by the feed conveyor 7 for shipment. The constitution of the bundler 8 is well known, as disclosed in JP-B-3298896.

Detailed Constitution of the Counter Ejector

Figure 2:
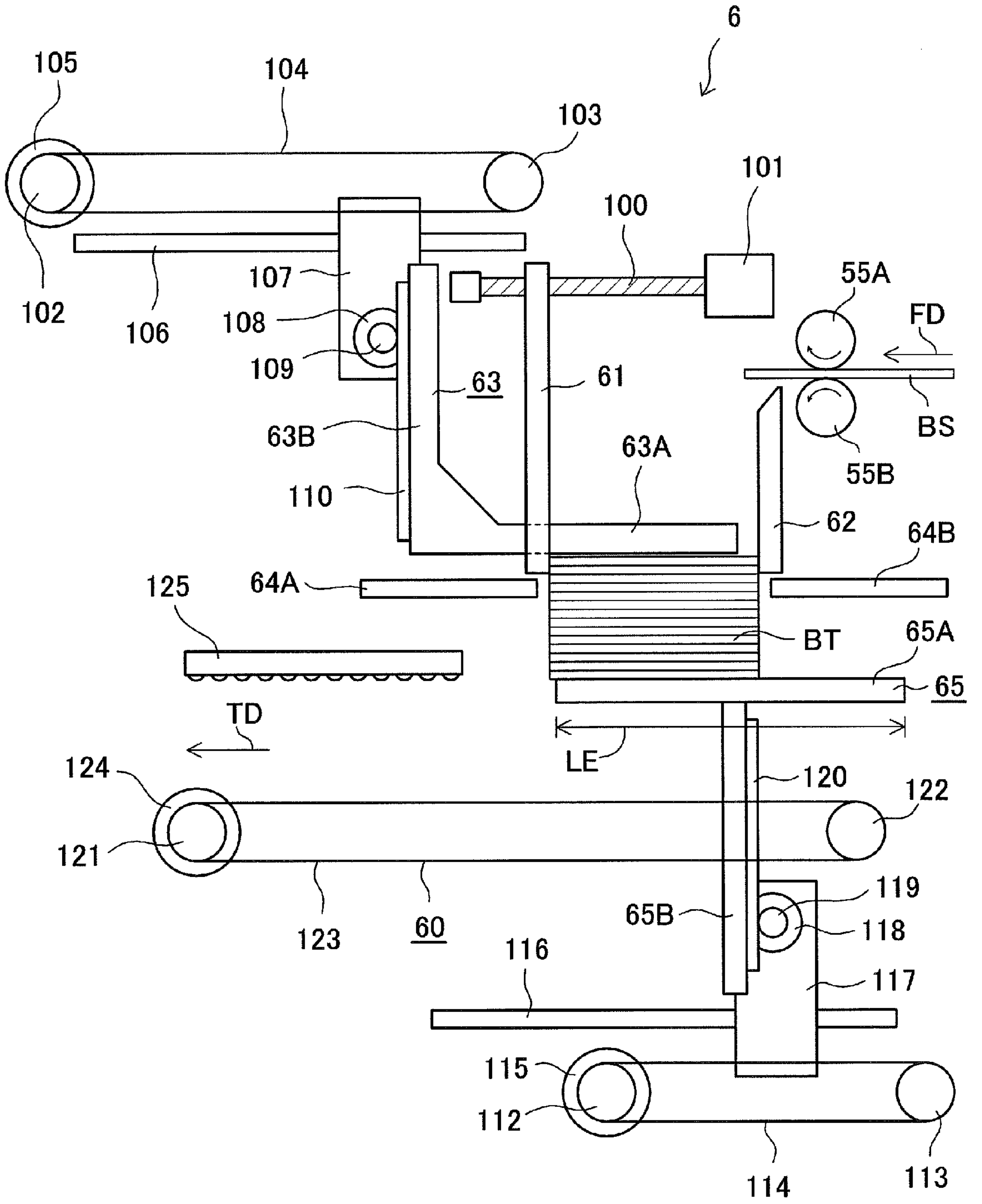
FIG. 2 is an expanded side view showing the detailed structure of the counter ejector of the cardboard sheet box-making machine according to the embodiment of the present invention.

The counter ejector 6 is explained with reference to FIG. 2. The counter ejector 6 comprises a front contact plate 61, a spanker 62, a main ledge 63, a pair of auxiliary ledges 64A, 64B, an elevator 65, a lower conveyor 60, and the like.

The front contact plate 61 is disposed to contact the front end portion of cardboard sheets BS fed and supplied in a predetermined feed direction FD by a pair of exit rollers 55A, 55B. A screw shaft 100 is rotatably supported by a frame of the counter ejector 6 in a horizontal state. The screw shaft 100 is linked to the output shaft of a front contact plate drive motor 101. The top end portion of the front contact plate 61 engages the screw shaft 100. The front contact plate 61 moves in the feed direction in response to the direction and amount of rotation of the front contact plate drive motor 101. The front contact plate 61 is positioned so that the gap between the front contact plate 61 and the spanker 62 is determined by the dimension of the cardboard sheets BS in the feed direction FD.

The spanker 62 is positioned proximate to the pair of exit rollers 55A, 55B so as to contact the back end portion of the supplied cardboard sheets BS. The supplied cardboard sheets BS are loaded inside the housing space demarcated by the front contact plate 61, the spanker 62, and the like. The spanker 62 implements a known straightening motion in the feed direction to align the end portions of the loaded cardboard sheets BS. The spanker 62 is disposed in a fixed positional relationship to the pair of exit rollers 55A, 55B allowing the spanker 62 to contact the back end portion of the cardboard sheets BS in the course of the straightening motion.

The main ledge 63 has an L-shaped form, and comprises a horizontal extension portion 63A and a vertical standing portion 63B. A drive pulley 102 and a driven pulley 103 are rotatably supported by the frame of the counter ejector 6. A ledge drive belt 104 is horizontally installed in the feed direction between the drive pulley 102 and the driven pulley 103. The drive pulley 102 is coupled to the output shaft of a belt drive motor 105. A guide rail 106 is horizontally supported by the frame of the counter ejector 6 proximate to the ledge drive belt 104. The ledge support body 107 is supported by the guide rail 106 to be movable in the feed direction. The ledge support body 107 is affixed at top end thereof to the ledge drive belt 104. A ledge hoist motor 108 is affixed atop the ledge support body 107. A pinion 109 is affixed to the output shaft of the ledge hoist motor 108. A rack 110 is affixed to the vertical standing portion 63B of the main ledge 63. The rack 110 meshes with the pinion 109. The vertical standing portion 63B of the main ledge 63 is supported to be movable up and down by a support mechanism disposed on the ledge support body 107.

The main ledge 63 is positioned in the feed direction in accordance with the direction and amount of rotation of the belt drive motor 105, and is positioned in the feed direction in accordance with the direction and amount of rotation of the ledge hoist motor 108.

An auxiliary ledge 64A is disposed so as to retract and advance in the feed direction (horizontal direction) relative to the front contact plate 61. An auxiliary ledge 64B is disposed so as to retract and advance in the feed direction (horizontal direction) relative to the spanker 62. The two auxiliary ledges 64A, 64B move in a mutually approaching direction, supporting the bottom surface of a cardboard sheets BS, move in a mutually separating direction, handing over the cardboard sheet BS to the elevator 65. The two auxiliary ledges 64A, 64B are coupled to the ledge drive motor 111 shown in FIG. 3 by a coupling mechanism.

The elevator 65 comprises a table 65A at top portion thereof and a support rod 65B at bottom portion thereof. The table 65A is of a size capable of loading the maximum dimension cardboard sheet producible by the cardboard sheet box-making machine 1. Specifically, the dimension LE in the feed direction of the table 65A is essentially equal to the length in the feed direction of the maximum dimension cardboard sheet.

A drive pulley 112 and a driven pulley 113 are rotatably supported by the counter ejector 6 frame. An elevator drive belt 114 is installed in a horizontal state between the drive pulley 112 and the driven pulley 113. The drive pulley 112 is coupled to the output shaft of a table movement motor 115. A guide rail 116 is horizontally supported by the counter ejector 6 frame in proximity to the elevator drive belt 114. The elevator support body 117 is supported by the guide rail 116 to be movable in the horizontal direction. The elevator support body 117 is affixed at lower end portion thereof to the elevator drive belt 114. A table hoist motor 118 is affixed to the top of the elevator support body 117. A pinion 119 is affixed to the output shaft of the table hoist motor 118. A rack 120 is affixed to the support rod 65B of the elevator 65. The rack 120 meshes with a pinion 119. The support rod 65B of the elevator 65 is supported so as to be movable up and down by a support mechanism erected on the elevator support body 117.

The elevator 65 is positioned along the feed direction in accordance with the direction and amount of rotation of the table movement motor 115, and is positioned in the up-down direction in accordance with the direction and amount of rotation of the table hoist motor 118. In other words, the elevator 65 table 65A moves in the feed direction relative to the position at which the spanker 62 is disposed, and moves in the up-down direction between the height at which the bottom end portions of the front contact plate 61 and the spanker 62 are disposed, and the height at which the lower conveyor 60 is disposed.

The lower conveyor 60 comprises a drive pulley 121, a driven pulley 122, a conveyor drive belt 123, and a belt drive motor 124. The drive pulley 121 and driven pulley 122 are rotatably supported by the counter ejector 6 frame. The conveyor drive belt 123 is installed in a horizontal state in the feed direction between the drive pulley 121 and the driven pulley 122. The drive pulley 121 is coupled to the output shaft of the belt drive motor 124.

An upper conveyor 125 is disposed at a predetermined gap relative to the lower conveyor 60. The upper conveyor 125 is moved in the up-down direction relative to the lower conveyor 60 by a servo motor, not shown, so that the gap between the upper conveyor 125 and the lower conveyor 60 is essentially equal to the thickness in the up-down direction of the batch BT. The upper conveyor 125 is coupled to the output shaft of the belt drive motor 124 via a known coupling mechanism.

Under rotation of the belt drive motor 124, the lower conveyor 60 works in tandem with the upper conveyor 125, transferring the batch BT in a predetermined transfer direction TD toward the feed conveyor 7. The predetermined transfer direction TD is parallel to the predetermined feed direction FD, and is the same as the direction in which the front contact plate 61 separates from the spanker 62.

The counter ejector 6 comprises a light sensor for counting the number of cardboard sheets BS supplied from the folder-gluer 5. The light sensor is disposed in proximity to the pair of exit rollers 55A, 55B, and detects the passing of a cardboard sheet BS.

Electrical Constitution

Figure 3:
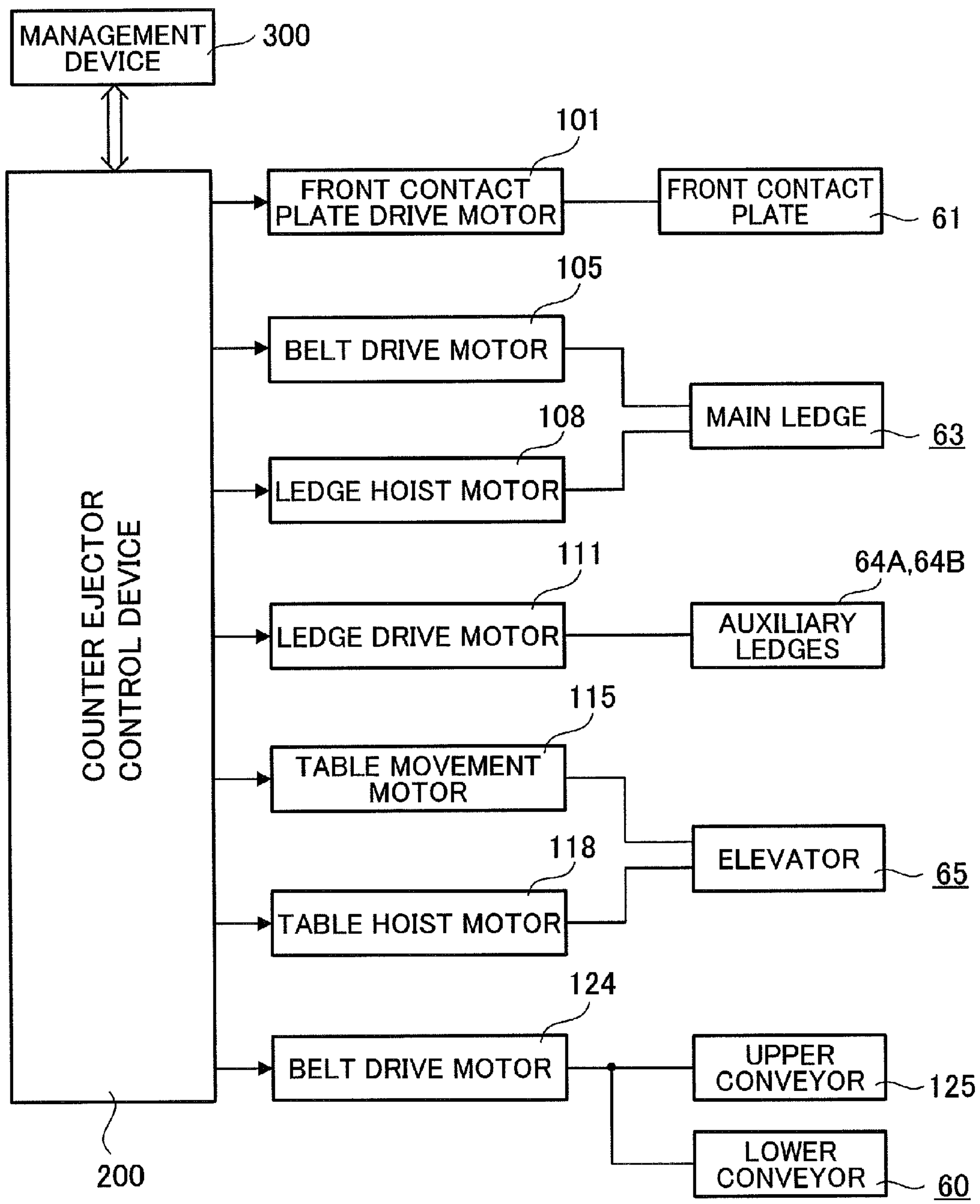
FIG. 3 is a block diagram showing the electrical configuration of the counter ejector of the cardboard sheet box-making machine according to the embodiment of the present invention.

The basic electrical constitution of the counter ejector 6 of the cardboard sheet box-making machine 1 of the present embodiment is known, e.g., through JP-A-2009-291992; an explanation is therefore here omitted, and only the electrical constitution for controlling the counter ejector 6 is explained below, referring to FIG. 3. FIG. 3 is a block diagram showing the electrical constitution of a counter ejector for a cardboard sheet box-making machine according to the embodiment of the present invention.

As shown in FIG. 3, a counter ejector control device 200 controls the overall operation of the counter ejector 6. A management device 300 performs production management of the cardboard sheet box-making machine 1 in order to execute multiple continuous orders, supplying the control device 200 with control information such as production speed, cardboard sheet dimensions, and batch sheet count for each order. The control device 200 is connected to a light sensor for detecting the passage of cardboard sheets BS, and counts the number of cardboard sheets BS supplied by the pair of exit rollers 55A, 55B based on a detection signal from the light sensor. The control device 200 controls the multiple motors driving each of the constituent parts of the counter ejector 6 in accordance with control information from the management device 300 and the counted cardboard sheets BS sheet count. The control device 200 is respectively connected to the belt drive motor 105 and the ledge hoist motor 108 for moving the main ledge 63, the ledge drive motor 111 for moving the auxiliary ledges 64A, 64B, the table movement motor 115 and table hoist motor 118 for moving the elevator 65, and the belt drive motor 124 for driving the belt drive motor 124 and lower conveyor 60.

The control device 200 comprises a computer including a CPU, ROM, RAM, and the like. The ROM stores a control program for controlling the counter ejector 6. The RAM temporarily stores CPU processing results such as the cardboard sheet BS sheet count and control information from the management device 300.

Operation of the Counter Ejector

The operation of the counter ejector 6 of the present embodiment is explained below with reference to FIGS. 4A through 4F and FIG. 5.

Order Changes

An operation of the cardboard sheet box-making machine 1 is stopped for order changes. During this cessation of operation, settings of each processing device, such as the printing device 3, is changed according to the dimension of the cardboard sheet in order to produce and process cardboard sheets for the new order. The counter ejector control device 200 receives control information for the new order from the management device 300.

The control device 200 positions the front contact plate 61 and the elevator 65 in the feed direction in accordance with control information indicating the dimension of the cardboard sheet BS in the feed direction FD. Specifically, the control device 200 stores control information indicating the dimension of the cardboard sheet BS in the feed direction FD for a previous order and a later order and calculates the difference between the two orders in the cardboard sheet BS dimension. When the dimension of the cardboard sheet BS in the later order is longer than the cardboard sheet BS in the previous order, the control device 200 controls the direction and amount of rotation by the front contact plate drive motor 101 and the table movement motor 115 so that the front contact plate 61 and the elevator 65 move toward the downstream side in the feed direction by just the calculated differential amount. Conversely, when the dimension of the cardboard sheet BS in the later order is shorter than the cardboard sheet BS in the previous order, the control device 200 controls the direction and amount of rotation by the two motors 101 and 115 so that the front contact plate 61 and the elevator 65 move toward the upstream side in the feed direction by just the calculated differential amount. By controlling these motors, the front contact plate 61 is positioned relative to the spanker 62 so that the gap between the front contact plate 61 and the spanker 62 is essentially equal to the dimension of the cardboard sheets BS in the new order, which is the later order. The table 65A of the elevator 65 also moves by the amount of movement of the front contact plate 61 in the same direction as the direction of movement of the front contact plate, and is positioned so that the front edge of the table 65A as shown in FIG. 2 is at essentially the same position in the feed direction as the back surface of the front contact plate 61. When the table 65A is positioned, the table 65A can perform raising and lowering motions at the positioned location. In FIG. 2, the region in which the table 65A travels up and down corresponds to the raising and lowering path. The bottom-most position of the table 65A in the raising and lowering path corresponds to the height at which the lower conveyor 60 is disposed.

The main ledge 63 moves to an upper position at which the main ledge 63 does not interfere with the cardboard sheets BS supplied from the pair of exit rollers 55A, 55B, and the main ledge 63 then stands by. The pair of auxiliary ledges 64A, 64B move in a mutually approaching direction so as to be able to receive supplied cardboard sheets BS, and the ledges then stand by. The elevator 65, positioned as described above in the feed direction, rises to the height at which the pair of auxiliary ledges 64A, 64B are disposed. The control device 200 controls the rotational direction and the amount of rotation of the ledge hoist motor 108, the ledge drive motor 111, and the table hoist motor 118 to move the main ledge 63 and the auxiliary ledges 64A, 64B, and to raise the elevator 65.

The control device 200 controls a servo motor (not shown) to position the upper conveyor 125 relative to the lower conveyor 60 in the up-down direction in accordance with control information indicating the number of predetermined sheets in the batch BT.

Batch Forming Operation

An operation of the cardboard sheet box-making machine 1 commences when the various setting operations required for an order change are completed. With this startup of operation, the pair of exit rollers 55A, 55B rotates and supply of cardboard sheets BS commences. A predetermined straightening operation by the spanker 62 to align the end portion of the cardboard sheets BS also commences.

The control device 200 counts the number of cardboard sheets BS loaded between the front contact plate 61 and the spanker 62 based on a detection signal from the light sensor. During the sheet counting operation, the control device 200 judges whether the counted number of sheets has reached a predetermined sheet count based on control information indicating the predetermined number of sheets in a batch. When the number of counted sheets reaches the predetermined sheet count, the control device 200 controls the ledge drive motor 111 so that the auxiliary ledges 64A, 64B move in a mutually separating direction. As a result of the movement of the two auxiliary ledges in a mutually separating direction, the predetermined number of cardboard sheets BS is passed to the table 65A of the elevator 65 standing by.

Figure 4A:
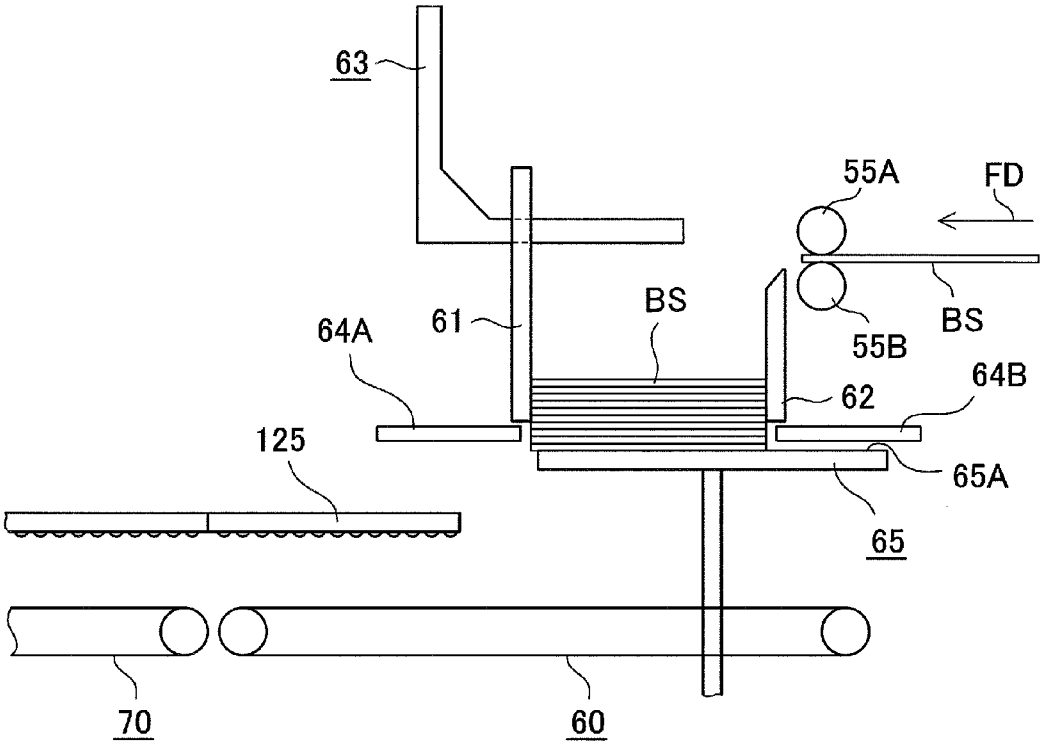
FIG. 4A is an explanatory view showing the state in which a pair of auxiliary ledges move in a mutually separating direction, and a main ledge stands by at a position slightly above the height at which a pair of rollers are disposed, in the counter ejector of the cardboard sheet box-making machine according to the embodiment of the present invention.

When the counted number of sheets reaches the predetermined sheet count, the control device 200 controls the ledge hoist motor 108 so that the main ledge 63 descends from the standby position slightly above the height at which the pair of exit rollers 55A, 55B are disposed. FIG. 4A depicts the state in which the two auxiliary ledges 64A, 64B move in a mutually opposing direction, and the main ledge 63 stands by at a position slightly above the height at which the two exit rollers are disposed.

Figure 4B:
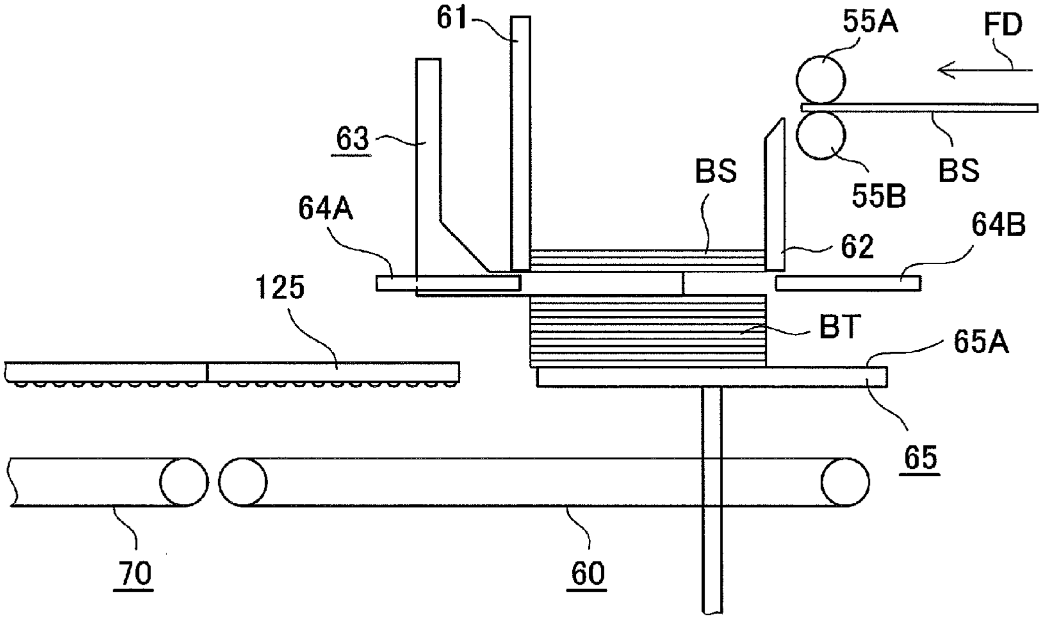
FIG. 4B is an explanatory view showing the state in which the horizontally extending part of the main ledge is lowered to the height at which the two auxiliary ledges are disposed in a counter ejector of the cardboard sheet box-making machine according to the embodiment of the present invention.

The main ledge 63 and the elevator 65 both descend from the state shown in FIG. 4A. As the main ledge 63 descends, the main ledge 63 receives and loads the cardboard sheets BS supplied from the two exit rollers 55A, 55B. When the horizontal extension portion 63A of the main ledge 63 descends to the height at which the two auxiliary ledges 64A, 64B are positioned, then stops, the two auxiliary ledges move in a mutually approaching direction. FIG. 4B depicts the state in which the main ledge 63 horizontal extension portion 63A is descended to the height at which the two auxiliary ledges 64A, 64B are disposed.

The main ledge 63 and the elevator 65 both begin to descend from the state shown in FIG. 4B. The horizontal extension portion 63A of the main ledge 63 descends together with the elevator 65 while pressing down from above on the batch BT on the table 65A of the elevator 65. The pressing down from above of the batch BT on the table 65A by the horizontal extension portion 63A maintains the horizontal attitude of the batch BT during descent, and enables the strong adhesion of each of the glued parts of the cardboard sheets BS in the batch BT.

Figure 4C:
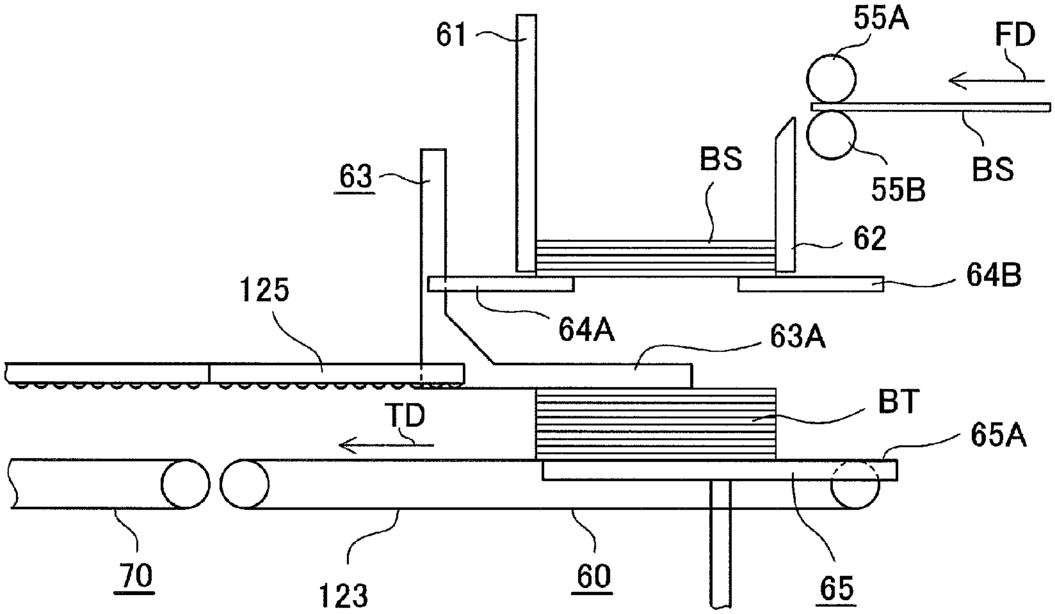
FIG. 4C is an explanatory view showing the state in which a batch BT on the elevator table has been handed over to a lower conveyor in the counter ejector of the cardboard sheet box-making machine according to the embodiment of the present invention.

When the table 65A of the elevator 65 descends to the height of the top surface of the conveyor drive belt 123 of the lower conveyor 60, i.e., to the lowermost position of the table 65A raising and lowering path, the batch BT on the table 65A is moved and loaded from the table 65A to the lower conveyor 60. In other words, the batch BT is transferred onto the lower conveyor 60. The upper conveyor 125 and the lower conveyor 60 are driven by the control device 200 causing the belt drive motor 124 to rotate. FIG. 4C shows the state in which the batch BT on the table 65A has been handed over to the lower conveyor 60. When the lower conveyor 60 transfers the batch BT in a predetermined transfer direction TD, the main ledge 63 moves toward the downstream side in the feed direction in FIG. 4C as the main ledge 63 pushes the batch BT upward. The pressure of the main ledge 63 causes the batch BT on the lower conveyor 60 to be transferred without losing alignment thereof in the feed direction.

Figure 4D:
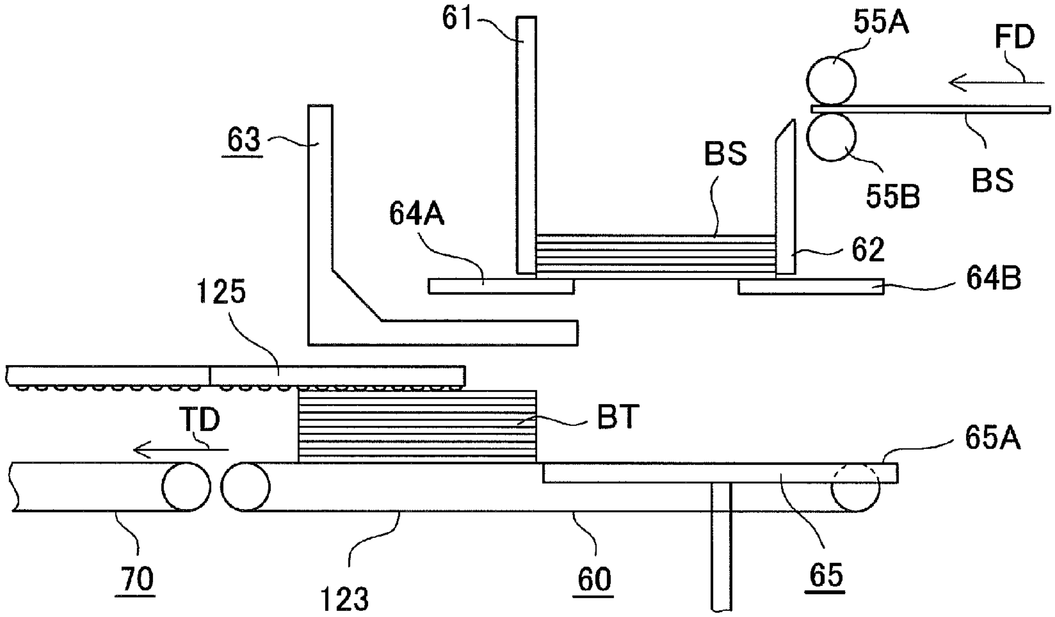
FIG. 4D is an explanatory view showing the state in which the batch BT is held between the lower conveyor and an upper conveyor in the counter ejector of the cardboard sheet box-making machine according to the embodiment of the present invention.

When the batch BT is ejected to the point where the batch BT is held between the lower conveyor 60 and the upper conveyor 125, the main ledge 63 separates from the batch BT and rises. FIG. 4D shows the state in which the batch BT is held between the lower conveyor 60 and the upper conveyor 125.

While the batch BT is being transferred by the lower conveyor 60, the table 65A of the elevator 65 stands by at a position slightly below the top surface of the conveyor drive belt 123 so as not to interfere with the transfer of the batch BT. As shown in FIG. 4D, when the batch BT is transferred to the point that the batch BT is completely separated from the table 65A, the elevator 65 is placed in a state whereby the elevator 65 is able to rise.

Figure 4E:
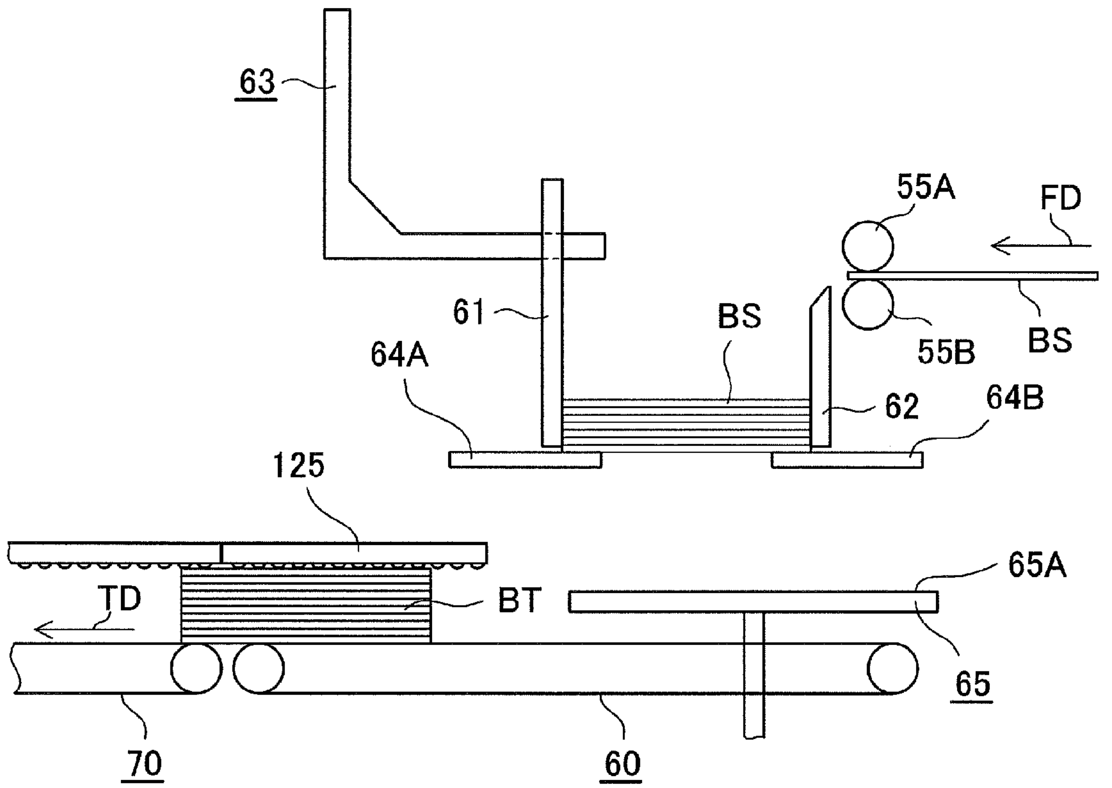
FIG. 4E is an explanatory view showing the state immediately following the start of rising by an elevator from the height at which the lower conveyor is disposed in the counter ejector of the cardboard sheet box-making machine according to the embodiment of the present invention.
Figure 4F:
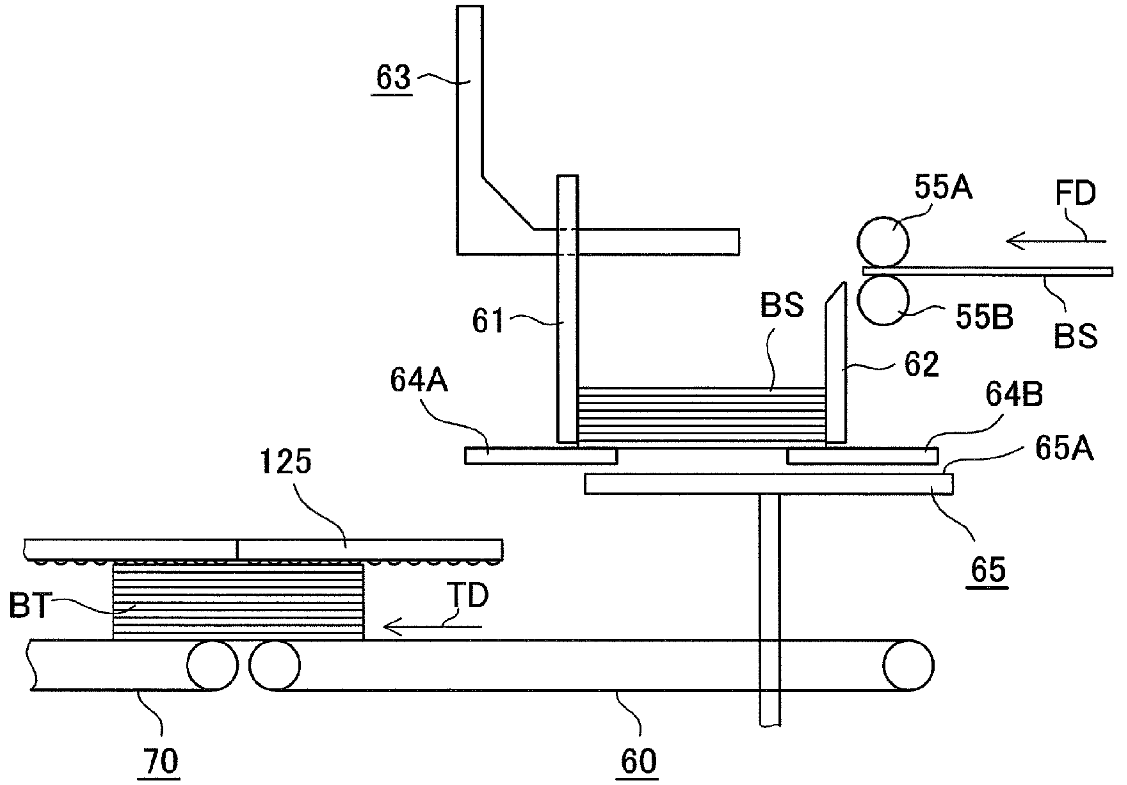
FIG. 4F is an explanatory view showing the state in which the elevator rises and stops at a height immediately below two auxiliary ledges in the counter ejector of the cardboard sheet box-making machine according to the embodiment of the present invention.

The elevator 65 starts to rise from the state shown in FIG. 4D. FIG. 4E shows the state immediately following the start of rising by the elevator 65 from the height at which the elevator 65 is disposed. The elevator 65 rises to a height close to the lower end of the front contact plate 61 and the spanker 62, i.e., to a height immediately below the two auxiliary ledges 64A, 64B, and stops. FIG. 4F shows the state in which the elevator 65 has risen to a height immediately under the two auxiliary ledges 64A, 64B and stopped.

When the table 65A of the elevator 65 rises from the state shown in FIG. 4D to the state shown in FIG. 4F, the table 65A of the elevator 65 rises by driving the table hoist motor 118 only, without movement in the feed direction. As a result, in FIG. 4F the table 65A of the elevator 65 is able to accurately maintain a fixed positional relationship in the feed direction to the loaded cardboard sheets BS.

When the elevator 65 has risen to a position immediately below the two auxiliary ledges 64A, 64B, as shown in FIG. 5F, the two auxiliary ledges move in a mutually separating direction. As a result of the movement of the two auxiliary ledges, the cardboard sheets BS loaded between the front contact plate 61 and the spanker 62 are handed over to the table 65A of the elevator 65, as shown in FIG. 4A. In FIG. 4F, when the batch BT is further transferred and fully handed over from the lower conveyor 60 to the feed conveyor 70, the control device 200 stops the belt drive motor 124, thereby stopping the upper conveyor 125 and the lower conveyor 60.

The repetition of the series of motions of loading, separation, and transfer of the cardboard sheets BS shown in FIG. 4F results in the continuous transfer toward the feed conveyor 70 of a batch BT made up of a predetermined number of sheets.

Effect of the Counter Ejector

Figure 5:
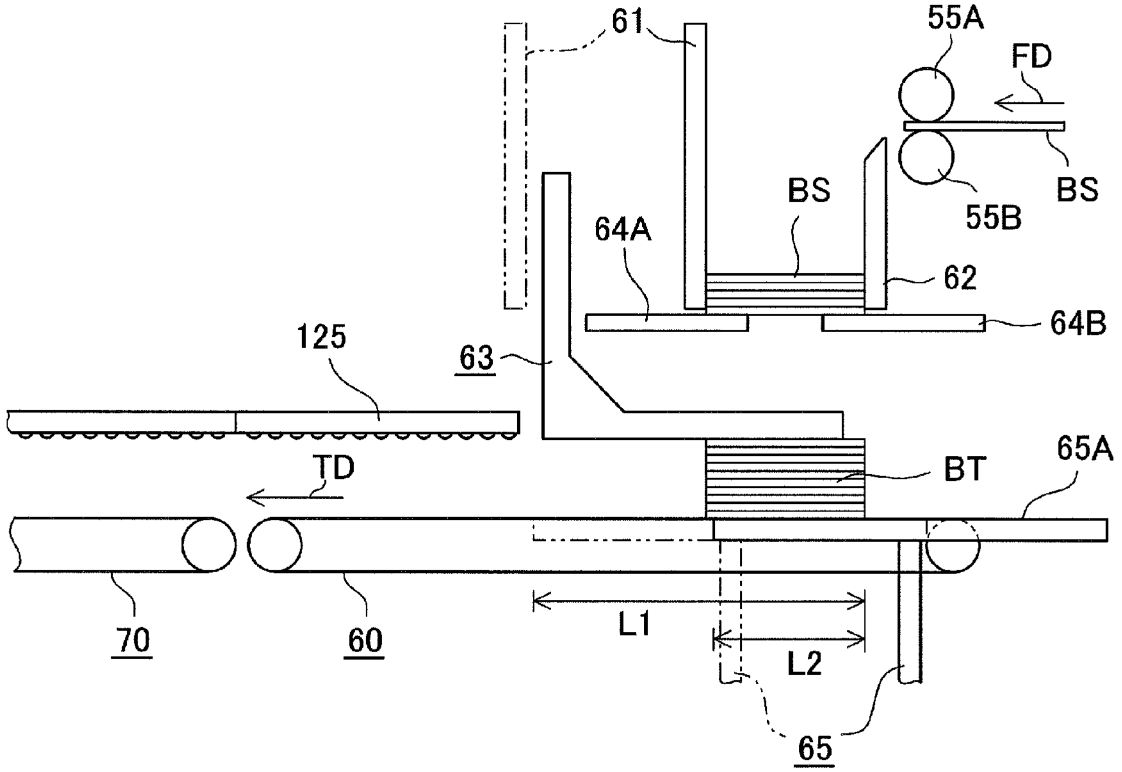
FIG. 5 is an explanatory view comparing the case in which the dimension in the feed direction of a cardboard sheet BS is at longest thereof to the case in which the cardboard sheet BS is at shortest thereof, thereby explaining the relationship between the ejection of the batch BT and the start of the elevator rise in the counter ejector of the cardboard sheet box-making machine according to the embodiment of the present invention.

The effect of the embodiment of the present invention is explained with reference to FIG. 5. When the dimension in the feed direction FD of the cardboard sheets BS is at longest thereof, the front contact plate 61 and the elevator 65 are respectively positioned at the positions in the feed direction shown by the double-dashed line in FIG. 5. On the other hand, when the dimension in the feed direction FD of the cardboard sheets BS is relatively short, the front contact plate 61 and the elevator 65 are respectively positioned at the positions in the feed direction shown by the solid line in FIG. 5. In the conventional devices disclosed in JP-A-2009-51024 and JP-B-3298896, there is no movement of the elevator in the feed direction, therefore the table of the elevator ascends and descends at a position in the feed direction at which the table can receive the largest cardboard sheet, which is to say the position in the feed direction shown by the double dash line in FIG. 5.

In order to start rising after the elevator 65 has handed over the batch BT to the lower conveyor 60, the back edge of the batch BT must pass the front edge of the table 65A of the elevator 65 and be completely separated from the table 65A. In conventional devices, it was necessary when transferring relatively short cardboard sheets that the batch BT be transferred by the distance L1 shown in FIG. 5 in order for the back edge of the batch BT to pass the front edge of the table 65A of the elevator 65 shown by the double dashed line. In the present embodiment, by contrast, when a relatively short cardboard sheet is transferred, the positioning at the time of an order change of the table 65A of the elevator 65 in the feed directional position shown by the solid line in FIG. 5 according to the dimension in the cardboard sheet feed direction means that the back edge of the batch BT can be made to pass the front edge of the table 65A of the elevator 65 shown by the solid line by transferring the batch BT by the distance L2 shown in FIG. 5. As a result, in the present embodiment the elevator 65 is able to start rising faster than in the conventional device by a time equal to the time needed to transfer the batch BT over the distance differentia (L1–L2), so the batch BT can be formed and transferred at a higher speed.

Variations

The embodiment of the present invention is explained above, but a person skilled in the art would be able to add numerous variations without deviating from the intent of the present invention.

(1) In the counter ejector 6 of the embodiment of the present invention, the elevator 65 is moved in the feed direction by the drive force of an elevator drive belt 114 installed between the drive pulley 112 and the driven pulley 113, and ascends and descends in the up-down direction by the meshing of a rack 120 and a pinion 119. In lieu of this belt drive constitution and rack and pinion constitution, it is also acceptable for the movement and raising/lowering of the elevator to be accomplished by the operation of some other power transmission mechanism. For example, a configuration is also acceptable in which a screw shaft coupled to a drive motor and a nut portion meshing with that screw shaft are provided, whereby the nut portion is rotatably installed on the support rod 65B of the elevator 65, or on the support body 117 of the elevator.

(2) In the counter ejector of the embodiment of the present invention, the elevator 65 is configured by affixing the support rod 65B to the table 65A, and the table movement motor 115 drives the table 65A and support rod 65B to move as a single piece in the feed direction. In lieu of this configuration, it is also acceptable for the table 65A to be supported so as to be movable in the feed direction relative to the support rod 65B, with the drive motor which moves the table 65A affixed to the support rod 65B, and the drive motor which raises and lowers the support rod 65B affixed to the frame of the counter ejector 6. In this variation, the load on the drive motor which moves the table 65A in the feed direction is reduced because only the table 65A is moved, so motor load is reduced, and the table can be accurately positioned using a small motor.

(3) In the counter ejector of the embodiment of the present invention, the counter ejector control device 200 causes the main ledge 63 to descend from the upper standby position when the counted number of cardboard sheets BS reaches a predetermined number of sheets. In lieu of this, when the cardboard sheets BS feed speed is further increased, it is also acceptable for the control device 200 to issue a control command commanding the main ledge 63 to descend when the number of counted sheets reaches a count one less than the predetermined sheet count, thereby speeding up the start of descent of the main ledge 63.

(4) In the counter ejector of the present embodiment, as shown in FIG. 4B, the main ledge 63 temporarily halts downward movement thereof when the auxiliary ledges 64A, 64B move in a mutually approaching direction. In lieu of this, it is also acceptable not to stop the downward movement of the main ledge 63 when the auxiliary ledges 64A, 64B move in a mutually approaching direction. This variation enables a further speed up of the batch forming operation.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. A counter ejector of a cardboard sheet box-making machine for counting and forming batches of a predetermined number of cardboard sheets which have been folded and glued by a folder-gluer after being subjected to processing such a printing, said counter ejector comprising:

- a front contact plate that contacts the front edge portion of a cardboard sheet fed in a predetermined feed direction from the folder-gluer, said front contact plate being moved in the feed direction;
- a spanker disposed in the feed direction facing the front contact plate to contact the back edge portion of the fed cardboard sheet and align the back edge portion;

a ledge that separates a plurality of cardboard sheets loaded between the front contact plate and the spanker, said ledge being capable of advancing and retracting in a horizontal direction so as to form batches of a predetermined number of sheets;

a transfer conveyor disposed below the front contact plate and the spanker to transfer the batches in a transfer direction which is the same as the predetermined feed direction;

an elevator, furnished with a table on which the cardboard sheet batches are loaded that raises and lowers the table, the table being moveable in the feed direction;

a front contact plate drive device that moves the front contact plate in the feed direction;

a table drive device to move the table in the feed direction; and a control device that controls the front contact plate drive device and the table drive device so as to move the front contact plate by respective lengths of the cardboard sheets and move the table in the feed direction by the amount of movement of the front contact plate in the feed direction prior to the cardboard sheet batches being loaded onto the table;

wherein the table moves up and down at a position where the batch on the table has been handed over to the transfer conveyor.

2. The counter ejector of the cardboard sheet box-making according to claim 1, wherein the table drive device moves the elevator including the table in the feed direction.

3. The counter ejector of the cardboard sheet box-making according to claim 1, wherein the table drive device moves only the table in the feed direction.

4. The counter ejector of the cardboard sheet box-making according to claim 1, wherein the control device controls the front contact plate drive device and the table drive device so that when a cardboard sheet order is changed, the front contact plate and the table move in the feed direction by the dimensional difference in the feed direction between cardboard sheets respectively processed based on a previous order and a subsequent order.

5. The counter ejector of the cardboard sheet box-making machine according to claim 1, wherein the transfer conveyer is arranged to extend downward in the path of the raising and lowering table, and when the table reaches the lowest position in the raising and lowering path, the batch loaded on the table is transferred, and the transfer conveyor transfers the batch.

* * * * *